United States Patent [19]

Newill

[11] Patent Number: 4,469,759
[45] Date of Patent: Sep. 4, 1984

[54] MAGNETIC ELECTROLYTE DESTRATIFICATION

[75] Inventor: William J. Newill, Dayton, Ohio

[73] Assignee: General Motors Corporation, Detroit, Mich.

[21] Appl. No.: 449,239

[22] Filed: Dec. 13, 1982

[51] Int. Cl.³ .................. H01M 2/00; H01M 2/38
[52] U.S. Cl. ........................... 429/10; 429/51; 429/72; 429/81; 204/DIG. 5
[58] Field of Search ............ 429/67, 10, 51, 72, 429/81; 204/DIG. 5

[56] References Cited

U.S. PATENT DOCUMENTS

| | | |
|---|---|---|
| 734,549 | 7/1903 | Halsey .......................... 429/67 |
| 3,083,253 | 3/1963 | Sundberg ...................... 429/51 |
| 3,305,404 | 2/1967 | Sundberg ...................... 429/59 |
| 3,597,278 | 8/1971 | Von Brimer ................... 429/10 |
| 4,194,060 | 3/1980 | Scholl et al. .................. 429/67 |

Primary Examiner—Donald L. Walton
Assistant Examiner—Gerard P. Raney
Attorney, Agent, or Firm—Lawrence B. Plant

[57] ABSTRACT

An electric storage battery including a magnetohydrodynamic pump between the active cell element and the container wall wherein the pump comprises a conduit magnet means for establishing a magnetic field transverse the conduit and electrode means for passing current transverse the field and the conduit to effect movement of electrolyte through the conduit.

6 Claims, 7 Drawing Figures

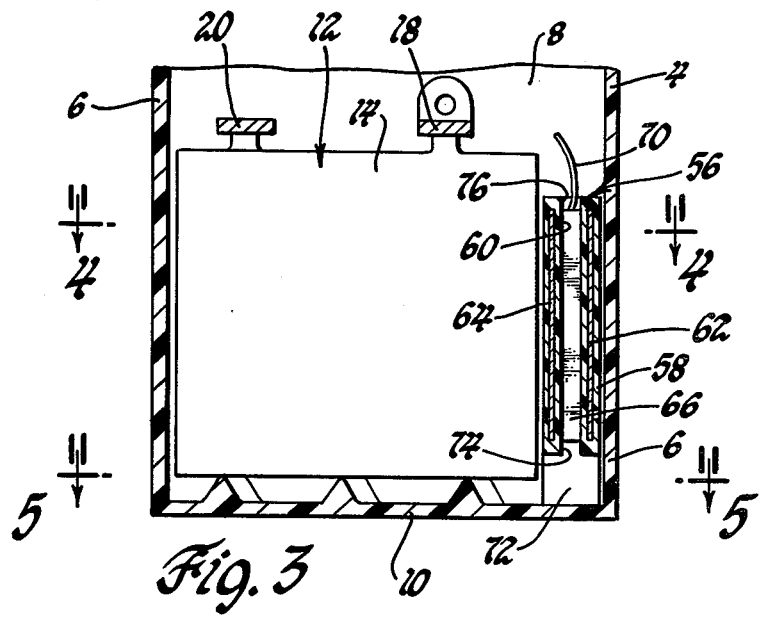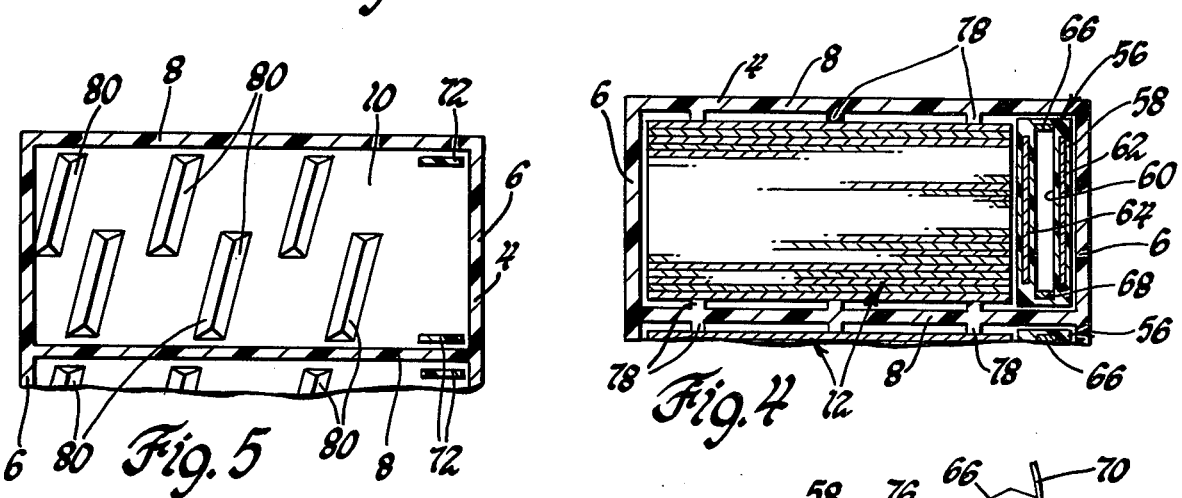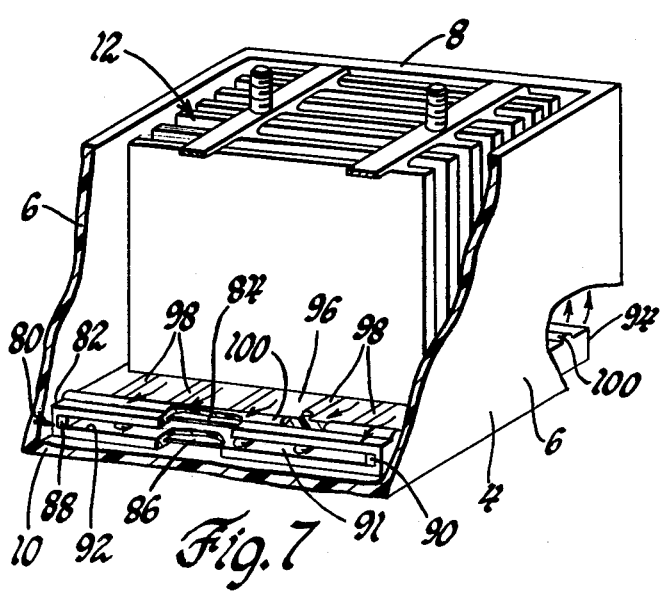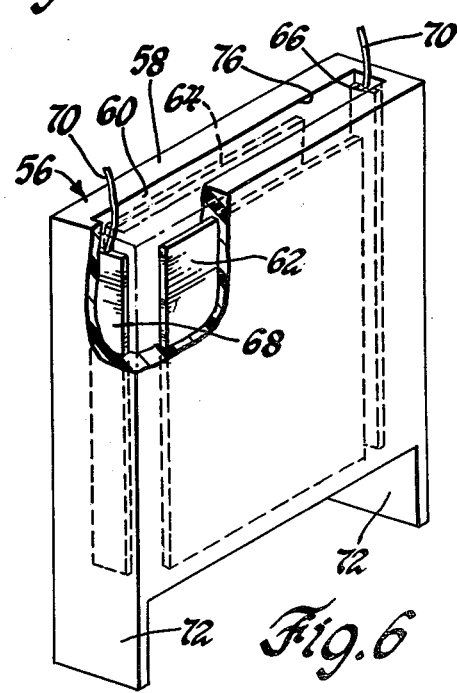

MAGNETIC ELECTROLYTE DESTRATIFICATION

This invention relates to secondary electric storage batteries (e.g., Pb-acid batteries) having stratifiable electrolytes wherein higher electrolyte concentrations occur at the bottom of the battery than at the top. More specifically this invention relates to means for circulating the electrolyte to achieve a more uniform electrolyte concentration throughout the battery.

BACKGROUND OF THE INVENTION

Pb-acid batteries, among others, are known to be susceptible to electrolyte concentration variations from top to bottom. This problem is particularly acute during the recharge of deep discharge batteries. In this regard, the heavy $H_2SO_4$ formed at the plates during recharge settles to the bottom of the battery causing high concentrations of $H_2SO_4$ thereat and weaker concentrations at the top. The electrolyte concentration imbalance is known as electrolyte stratification and is detrimental to battery performance and life.

Mixing or circulation of the electrolyte within the battery to promote concentration uniformity is known and a variety of arrangements have heretofore been proposed to effect this circulation. Sundberg U.S. Pat. No. 3,083,253, for example, describes air-lift-type pumps wherein the lift gas may be provided either by means of an external pump or by the in situ electrolysis of the electrolyte. External air pumps however are not only cumbersome, but require ancillary plumbing and battery vent system capable of exhausting the extra air from the battery. Generating the pumping gas by electrolytic dissociation of the electrolyte produces very small bubbles which are effective pumpers only if contained within small diameter lift tubes which requires a multiplicity of such tubes distributed throughout the cell element (i.e., alternately interspersed positive and negative polarity plates) in order to move enough electrolyte to be practical. Sundberg U.S. Pat. No. 3,305,404, inter alia, on the other hand, bubbles air beneath the cell element and allows the bubbles to rise between the several plates thereof. Such arrangements however have much of the complexity of the air-lift-type pumps and tend to promote oxidation of the plates. Halsey U.S. Pat. No. 734,549 and Scholl et al U.S. Pat. No. 4,194,060 employ externally driven impellers in the cell compartment. Needless to say, such arrangements are not only complex and expensive to manufacture but are also subject to leakage at the seals and wear at the impeller bearings.

Von Brimer U.S. Pat. No. 3,597,278, utilizes a magnetic field to effect circulation. Von Brimer positions the cell element, or portions thereof, between opposite polarity magnets so that the electrolyte is magnetically circulated when current flows between the element's plates. In one embodiment, Von Brimer locates a plurality of magnets between the several plates through openings in the interplate separators. This embodiment adds considerable weight to the battery, increases the risk of shortened life due to internal shorting through the openings in the separator and results in reduced performance due to the wide spacing between the plates/electrodes of the cell element. Alternatively, Von Brimer proposes that the magnetic field be established between the plates by magnets placed outside the cell element. This embodiment would require that the magents be widely spaced apart which would require very strong and hence very heavy and/or expensive magnets.

It is an object of the present invention to provide an electric storage battery with an uncomplicated, inexpensive, electrolyte-mobilizing magnetohydrodynamic pump adjacent the cell element for circulating electrolyte within the battery. This and other objects and advantages of the present invention will become more readily apparent from the detailed description thereof which follows.

BRIEF SUMMARY OF THE INVENTION

The present invention comprehends an electric storage battery having its electrochemically active cell element encased in a container and a discrete, lightweight, uncomplicated, electrolyte-mobilizing magnetohydrodynamic pump interjacent the cell element and the container wall. The magnetohydrodynamic pump of the present invention comprises a conduit having a central passageway therethrough terminating in inlet and outlet openings at substantially opposite ends of the conduit. The passageway lies between two opposite polarity magnets (i.e., permanent or electro-) which provide a magnetic field transverse the passageway. Opposing electrodes positioned in the passageway pass current through the electrolyte in the passage and transverse the magnetic field so as to move electrolyte through the conduit incident to the action of the magnetic field on the ions moving between the electrodes.

The magnetohydrodynamic pump will preferably be quite compact having a narrow magnetic field gap transverse a significantly greater electrolytic gap for optimum pumping within the narrow confines of a cell compartment. The magnetohydrodynamic pump of the present invention will: preferably be quite flat; have a vertical passageway and lie between the cell elements and the container sidewall; have a very narrow gap between the opposed magnets (i.e., the magnetic field gap); and have a relatively wide gap between the opposed electrodes (i.e., the electrolytic gap). Hence a pump is provided wherein the electrolytic gap is substantially greater than the magnetic field gap. Such a structure permits the use of inexpensive, lightweight, thin, transverse magnets of relatively low strength without significant loss of magnetic field strength, and provides a relatively large magnetic field through which the ions must pass. The pump will preferably be located between the lateral edges of the element's plates and the sidewall of the container such that the magnets are substantially adjacent the element and the sidewall and the electrodes are substantially adjacent the cell compartment end walls. The electrodes are preferably oriented in the conduit offset from the magnets by 90° (i.e., about the axis of the passageway) so that the current flows between the electrodes perpendicular to the direction of the magnetic field in order to provide the maximum magnetic force on the ions. If the current crosses the magnetic field at angles less than 90°, the magnetic force acting on the ions is less and varies directly with the sine of the angle at which the current crosses the field. The electrodes are preferably connected to an external power supply which can vary the current flow between the electrodes. However in some instances (e.g., float service batteries) the pump's electrodes may be energized by the battery itself.

The magnets will preferably be of the ceramic type and be embedded in the walls of the conduit to protect them from chemical attack. Where very strong magnetic fields are desired rare-earth type magnets may be used. Alternatively, electromagnets may be embedded in the conduit walls for applications where it is convenient to energize the magnetic field via an external source. Electromagnets also provide a capability to vary the intensity of the magnetic field.

DETAILED DESCRIPTION OF PREFERRED EMBODIMENTS

This invention may be better understood when considered in the light of the following detailed description of certain specific embodiments thereof which description is given in conjunction with the several drawings in which:

FIG. 3 is a sectioned view through the cell element of a battery taken in a plane parallel to the plates of the element and depicting another embodiment of the present invention;

FIG. 4 is a top sectioned view taken in the direction 4—4 of FIG. 3;

FIG. 5 is a top sectioned view taken in the direction 5—5 of FIG. 3;

FIG. 6 is a partially broken-way, isometric view of a discrete, insertable magnetohydrodynamic pump such as depicted in FIGS. 3 and 4; and, FIG. 7 is a broken away isometric illustration of still another embodiment of the present invention.

Figure 1:
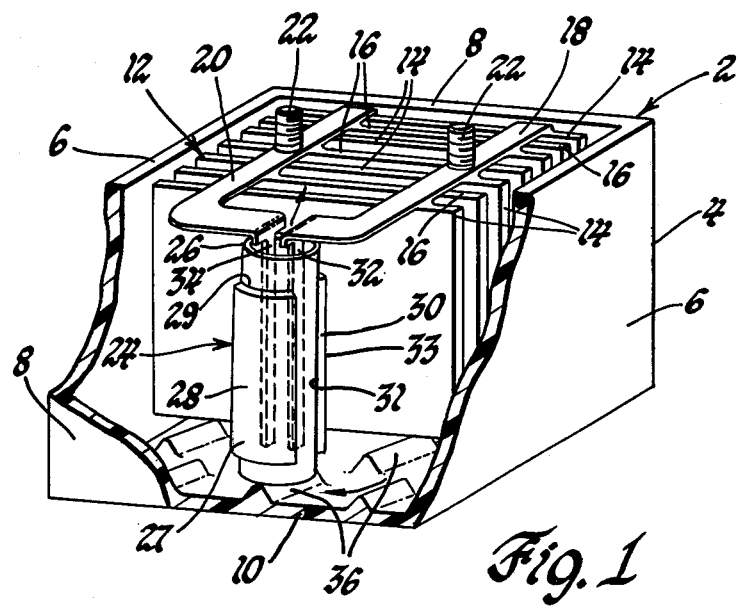
FIG. 1 is a broken-way, isometric illustration of one embodiment of the present invention.

FIG. 1 depicts a floating battery 2 including a container 4 comprising sidewalls 6, end walls 8 and bottom wall 10 defining a compartment for housing an electrochemically active cell element 12. The cell element 12 comprises a plurality of plates 14 of one polarity alternately interspersed a plurality of opposite polarity plates 16. Microporous dendrite suppressing separators (not shown) separate the several plates as is well known in the art. The plates 14 are electrically joined together by a first plate strap 18 and the plates 16 are electrically joined together by a second plate strap 20. Each plate strap 18 and 20 is joined to a stud 22, or the like, which forms, or is connected to, the battery's output terminals (not shown). A magnetohydrodynamic pump 24 is positioned interjacent, and substantially contiguous, the cell element 12 and the end wall 8. The magnetohydrodynamic pump 24 comprises an insulating tubular conduit 26 sandwiched between two arcuate magnets 28 and 30. The cell element 12 and the magnetohydrodynamic pump 24 rest on ribs 36 formed in the bottom wall 10. The ribs 36 facilitate flow of electrolyte from beneath the cell element 12. The magnets 28 and 30 are appropriately coated or otherwise protected from chemical attack by the battery electrolyte. Magnet 28 has its north pole on the outermost face 27 and its south pole on the innermost face 29 whereas the magnet 30 has its north pole on the innermost face 31 and its south pole on the outermost face 33. Accordingly, a magnetic field exists in a north-south direction between magnet 30 and magnet 28. An extension of the plate strap 18 defines a first leg 32 which projects down into the insulating tube 26 and serves as one of the pump's electrodes. Similarly, an extension of the plate strap 20 defines a second leg 34 which projects down into the tube 26 diametrically opposite to leg 32 and serves as the other pump electrode. The electrodes 32 and 34 are offset from the magnets 28 and 30 by 90° when viewed in the direction of the longitudinal center axis of the tube 26 and will always be at the same potential as their associated plates straps. In non-floating applications where it is desirable to connect the pump electrodes to the plate straps or battery terminals it is desirable to provide a switch (not shown) in series with one of the electrodes 32 or 34. The switch may be closed during recharge to effect circulation and then opened to preclude the possibility of self discharge of the battery through the pump.

Figure 2:
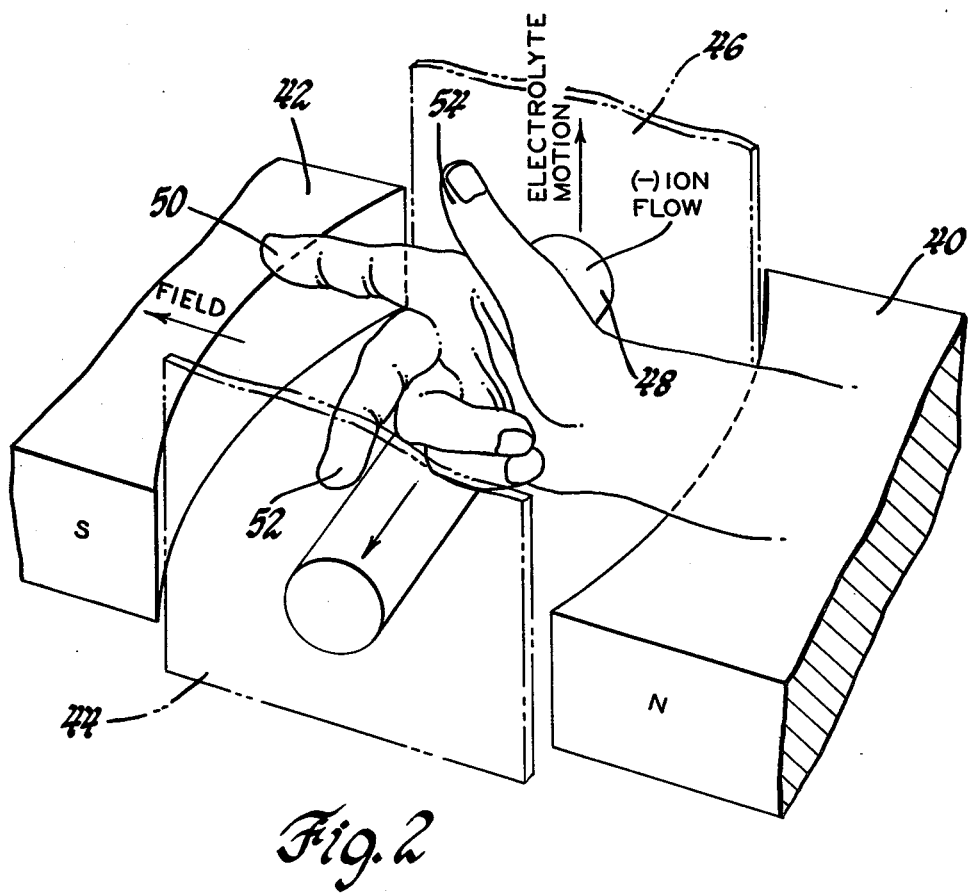
FIG. 2 is an isometric illustration of the "right-hand" rule as it applies to the present invention.

FIG. 2 depicts the physical principle underlying the present invention in terms of the well known "right-hand" rule for determining the direction a negative charge will move when passing through a magnetic field. FIG. 2 illustrates a north pole 40 of one magnet and a diametrically opposed south pole 42 of another magnet. One electrode 44 is diametrically opposed to another electrode 46 and at right angles to the direction of the magnetic field between the magnets 40 and 42. Using the "right-hand" rule we see that if the index finger 50 points in the direction of the magnetic field and the second finger 52 points in the direction that negative ions 48 move between the electrodes 46 and 44, the electrolyte will move in the direction indicated by the thumb 54. I prefer that the polarity of the magnets and the direction of current flow through the pump be such as to cause the electrolyte to flow upwardly so that the heavier electrolyte at the bottom of the cell is lifted to the top of the cell for mixing with the lighter electrolyte thereat.

FIGS. 3–6 depict a preferred embodiment of the present invention wherein a compact magnetohydrodynamic pump 56 is positioned between the edge of the cell element 12 and the sidewall 6 of the container 4 for lifting the heavy bottoms acid up along the side of the cell to the top of the element 12. In this embodiment the magnetohydrodynamic pump 56 includes a very thin/flat conduit 58 having a rectangular cross section (i.e., see FIG. 4) including very narrow passageway 60 between closely spaced (i.e., the magnetic gap) opposed magnets 62 and 64. The magnets are embedded in the walls of the conduit 58 for protection. Electrodes 66 and 68 are located at the opposite ends of the narrow passageway 60 to provide a relatively long electrolytic gap therebetween across the passageway 60. Connecting wires 70 extend from the electrodes 66 and 68 for connection to a separate, independent power source located outside the battery container. As circulation is only needed during and immediately following recharge the separate source may conveniently be provided at the charging station. The use of a separate power source permits the operator of the charging station to vary the potential and current flow between the electrodes 62 and 64 and thereby control the rate of electrolyte circulation.

The magnetohydrodynamic pump 56 of FIGS. 3–6 may be formed as a separate and discrete part which may simply be merely inserted into any battery having enough room between its cell element and container wall. Legs 72 formed integrally with the conduit 58 space the inlet opening 74 above the floor of the bottom wall 10 to permit ready flow of electrolyte into the inlet opening 74. The height of the outlet opening 76 atop the conduit 58 may be set as desired, but it is preferred that the outlet opening 76 be near enough to the top of the cell element 12 to discharge the electrolyte on top of the cell element for mixing with the dilute acid thereat and subsequent percolation of enriched electrolyte down between the plates.

As best shown in FIG. 4, the cell element 12 is spaced from the container walls by conventional spacing ribs 78 and from the bottom 10 (see FIG. 5) by upstanding bridges 80. The bridges 80 are shorter than the width of the cell chamber (i.e., between end walls 8) and are staggered so as to provide continuous support for the cell element 12 across the width of the chamber yet still permit electrolyte to flow across the bottom of the container toward the sidewalls 6.

FIG. 7 depicts still another embodiment of the present invention wherein the magnetohydrodynamic pump 80 rests on the bottom wall 10 of the container 4. Here the magnetohydrodynamic pump 80 includes a flat conduit 82 having magnets 84 and 86 molded into the sidewalls thereof and electrodes 88 and 90 positioned adjacent the end walls as shown. A very narrow passageway 91 lies between the magnets 84–86 and the electrodes 88–90. The magnetohydrodynamic pump 80 will extend most, but not all, of the width of the cell chamber such that the inlet and outlet openings 92 and 94, respectively, are spaced from the end walls 8 by an amount equal to about the width of the narrow passageway 91 so that electrolyte can freely enter and exit the passageway 91 at opposite ends of the conduit 82. In the alternative the flat pump could be rotated 90° so as to have the electrodes 88–90 lie adjacent the sidewalls 8 and the inlet and outlet openings 92–94 adjacent the end walls 6. The upper surface 96 of the conduit 82 includes a plurality of ribs 98 which raise the cell element 12 slightly above the conduit 82 for improved flow of electrolyte thereacross. Dams 100 may be provided at the ends of the ribs 98 near the inlet 92 and outlet 94 to trap any active material sheddings that might settle to the floor of the chamber. In this embodiment, electrolyte flowing across the top of the conduit 82 mixes with electrolyte flowing vertically along the sidewalls 8.

While this invention has been disclosed primarily in terms of specific embodiment thereof it is not intended to be limited thereto but rather only to the extent set forth in the claims which follow.

The embodiments of the invention in which an exclusive property or privilege is claimed are defined as follows:

1. An electric storage battery comprising: a container having bottom, end and side walls defining at least one cell compartment; a stack of closely spaced, alternately interspersed positive and negative polarity plates defining an electrochemically active cell element; a stratifiable electrolyte engulfing said element with said compartment; and a discrete magnetohydrodynamic pump immersed in said electrolyte outboard said element and interjacent said element and a said wall, said pump comprising:
    a conduit having wall means defining a passageway extending between an inlet opening at one end of said conduit, and an outlet opening at the other end of said conduit, said conduit serving to direct an upward flow of concentrated electrolyte around the outside of said element to above said element for downward percolation therethrough;
    means adjacent said passageway for establishing a magnetic field transverse said passageway;
    electrode means disposed within said passageway for passing current through said electrolyte transverse said field and said passageway and such as to move electrolyte through said conduit; and
    means defining an electric current path between said electrodes and a source of said current.

2. An electric storage battery comprising: a container having bottom, end and side walls defining at least one cell compartment; a stack of closely spaced, alternately interspersed positive and negative polarity plates defining an electrochemically active cell element; a stratifiable electrolyte engulfing said element within said compartment; and a discrete magnetohydrodynamic pump immersed in said electrolyte outboard said element and interjacent said element and a said wall, said pump comprising:
    a conduit having wall means defining a passageway extending between an inlet opening at one end of said conduit, and an outlet opening at the other end of said conduit, said conduit serving to direct an upward flow of concentrated electrolyte around the outside of said element to above said element for downward percolation therethrough;
    means adjacent said passageway for establishing a magnetic field transverse said passageway;
    electrode means disposed within said passageway for passing current through said electrolyte transverse said passageway and substantially normal to said field so as to move electrolyte through said conduit; and
    means defining an electric current path between said electrodes and said positive and negative plates.

3. An electric storage battery comprising: a container having bottom, end and side walls defining at least one cell compartment; a stack of closely spaced, alternately interspersed positive and negative polarity plates defining an electrochemically active cell element; a stratifiable electrolyte engulfing said element within said compartment; and a discrete magnetohydrodynamic pump immersed in said electrolyte outboard said element and interjacent said element and a said wall, said pump comprising:
    a conduit having wall means defining a passageway extending between an inlet opening at one end of said conduit, and an outlet opening at the other end of said conduit, said conduit serving to direct an upward flow of concentrated electrolyte around the outside of said element to above said element for downward percolation therethrough;
    means adjacent said passageway for establishing a magnetic field transverse said passageway;
    electrode means disposed within said passageway for passing current through said electrolyte transverse said passageway and substantially normal to said field so as to move electrolyte through said conduit; and
    means defining an electric current path between said electrodes and a source of said current.

4. An electric storage battery comprising: a container having bottom, end and side walls defining at least one cell compartment; a stack of closely spaced, alternately interspersed positive and negative polarity plates defining an electrochemically active cell element; a stratifiable electrolyte engulfing said element within said compartment; and a discrete magnetohydrodynamic pump immersed in said electrolyte outboard said element and interjacent said element and a said sidewall, said pump comprising:
    a substantially vertically oriented conduit having wall means defining a longitudinal passageway extending between an inlet opening adjacent said bottom wall and an outlet opening adjacent the top of said element and serving to conduct concentrated electrolyte from beneath said element around said element and discharge it substantially atop said element for downward percolation therethrough;

means adjacent said passageway for producing a magnetic field transverse said longitudinal passageway;

electrode means disposed within said passageway for passing current through said electrolyte transverse said field and said passageway and such as to cause substantially vertical motion of electrolyte through said conduit; and means defining an electric current path between said electrodes and a source of said current.

5. An electric storage battery comprising: a container having bottom, end and side walls defining at least one cell compartment; a stack of closely spaced, alternately interspersed positive and negative polarity plates defining an electrochemically active cell element; a stratifiable electrolyte engulfing said element within said compartment; and a discrete magnetohydrodynamic pump immersed in said electrolyte outboard said element and interjacent said element and a said wall, said pump comprising:

a conduit having wall means defining a passageway extending between an inlet opening at one end of said conduit, and an outlet opening at the other end of said conduit, said conduit serving to direct an upward flow of concentrated electrolyte around the outside of said element to above said element for downward percolation therethrough;

means embedded in said conduit wall for establishing a magnetic field transverse said passageway;

electrode means disposed within said passageway for passing current through said electrolyte transverse said field and said passageway and such as to move electrolyte through said conduit; and means defining an electric current path between said electrodes and a source of said current.

6. An electric storage battery comprising: a container having bottom, end and side walls defining at least one cell compartment; a stack of closely spaced, alternately interspersed positive and negative polarity plates defining an electrochemically active cell element; a stratifiable electrolyte engulfing said element within said compartment; and a discrete magnetohydrodynamic pump immersed in said electrolyte outboard said element and interjacent said element and a said wall, said pump comprising:

a conduit having wall means defining a passageway extending between an inlet opening at one end of said conduit, and an outlet opening at the other end of said conduit, said conduit serving to direct an upward flow of concentrated electrolyte around the outside of said element to above said element for downward percolation therethrough;

a pair of opposing magnets sandwiching said passageway and establishing a magnetic field therebetween transverse said passageway, said magnets being spaced apart by a relatively narrow first gap for intensification of said field;

a pair of opposing electrodes disposed within said passageway for passing electrolyte-mobilizing current therebetween transverse said field and said passageway, said electrodes being spaced apart by a second gap which is substantially greater than said first gap;

means defining an electric current path between said electrodes and a source of said current.

* * * * *